(12) United States Patent
Fahringer et al.

(10) Patent No.: US 6,386,945 B1
(45) Date of Patent: May 14, 2002

(54) METHOD OF CORRECTING CONICITY IN A TIRE WITH A FEEDBACK LOOP

(75) Inventors: John Edward Fahringer, Fairlawn; Frederick Forbes Vannan, III, Akron, both of OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/043,566
(22) PCT Filed: Sep. 20, 1996
(86) PCT No.: PCT/US96/15063
  § 371 Date: Mar. 19, 1998
  § 102(e) Date: Mar. 19, 1998
(87) PCT Pub. No.: WO97/12217
  PCT Pub. Date: Apr. 3, 1997
(51) Int. Cl.[7] ................................................ B24B 49/00
(52) U.S. Cl. .............................. 451/5; 451/10; 451/920
(58) Field of Search ........................... 451/1, 5, 10, 49, 451/65, 920; 157/13

(56) References Cited

U.S. PATENT DOCUMENTS

| | | |
|---|---|---|
| 3,543,576 A | 12/1970 | Bishop |
| 3,739,533 A | 6/1973 | Iida et al. |
| 3,841,033 A | 10/1974 | Appleby et al. |
| 3,946,527 A | 3/1976 | Beer |
| 3,948,004 A | 4/1976 | Gruber |
| 3,963,427 A | 6/1976 | Ugo |
| 4,041,647 A | 8/1977 | Ugo |
| 4,095,374 A | 6/1978 | Ugo |
| 4,914,869 A | 4/1990 | Bayonnet et al. |
| 4,984,393 A | 1/1991 | Rogers, Jr. |
| 5,167,094 A | 12/1992 | Wild et al. |
| 5,218,789 A | 6/1993 | Ino et al. |
| 5,263,284 A | 11/1993 | Wild |
| 5,645,465 A * | 7/1997 | Vannan, III ................. 451/5 |
| 6,086,452 A * | 7/2000 | Lipczynski et al. .......... 451/5 |

* cited by examiner

Primary Examiner—Timothy V. Eley
Assistant Examiner—Dung Van Nguyen
(74) Attorney, Agent, or Firm—Howard M. Cohn

(57) ABSTRACT

A method for correcting the conicity value in a pneumatic tire with a feedback system based on the average conicity value as predicted by lateral forces measured during grinding is used in combination with correcting for lateral force variation, and/or radial force variation, and/or radial run-out variation characteristics of a pneumatic tire by grinding the tread surface. The correction of the conicity value is accomplished by grinding either of the shoulder regions of the tire tread.

16 Claims, 5 Drawing Sheets

METHOD OF CORRECTING CONICITY IN A TIRE WITH A FEEDBACK LOOP

FIELD OF THE INVENTION

This invention relates to the field of optimizing tire uniformity, and more particularly to a method of correcting or shifting the conicity value, in combination with improving radial run-out, radial force variation, and lateral force variation characteristics of a pneumatic tire by grinding the tread surface in order to improve automobile directional stability.

BACKGROUND OF THE INVENTION

In the art of manufacturing pneumatic tires, rubber flow in the mold or minor differences in the dimensions of the belts, beads, liners, treads, plies of rubberized cords, sometimes cause non-uniformities in the final tire. When non-uniformities are of sufficient magnitude, they will cause force variations on a surface, such as a road, against which the tires roll and thereby produce vibrational and acoustical disturbances in the vehicle upon which the tires are mounted. Regardless of the cause of the force variations, when such variations exceed the acceptable minimum level, the ride of a vehicle utilizing such tires will be adversely affected.

The effects of non-uniformity are best explained by noting that several types of forces, which are of particular importance in the present application, are simultaneously exerted by a tire during its rotation under load against a surface. For example, radial run-out is an intrinsic tire non-uniformity best described as the "out of roundness" of the tire. Also radial forces are exerted in the radial direction of the tire, or in a direction perpendicular to its axis of rotation and non-tangential to the road surface. Additionally, lateral forces are exerted in the axial direction of the tire or in a direction parallel to its axis of rotation. Further, excessive conicity, defined as one-half of the net average lateral force resulting from a non-conical shaped tire, causes a tire to constantly pull to one side.

In a non-uniform tire, the radial run-out, the radial forces, and the lateral forces exerted by the tire will vary or change during its rotation. In other words, the magnitude and/or direction of the radial run-out, and the radial and lateral forces exerted by the tire will depend on which increment of its tread is contacting the surface.

The variations in radial and lateral force during rotation of a tire are usually caused by differences in the stiffness and/or geometry of the tire about its circumference or tread centerline. If these differences are slight, the radial and lateral force variations and therefore the degree of conicity will be insignificant and their effects unnoticeable when the tire is installed on a vehicle. However, when these differences reach a certain level, the radial and/or lateral force variations may be significant enough to cause rough riding conditions and/or difficult handling situations. Also, an excessive conicity value will cause a rolling tire to pull to one side.

Consequently, methods have been developed in the past to correct for excessive force variations by removing rubber from the shoulders and/or the central region of the tire tread by means such as grinding. Most of these correction methods include the steps of indexing the tire tread into a series of circumferential increments and obtaining a series of force measurements representative of the force exerted by the tire as these increments contact a surface. This data is then interpreted and rubber is removed from the tire tread in a pattern related to this interpretation. These methods are commonly performed with a force variation machine which includes an assembly for rotating a test tire against the surface of a freely rotating loading drum. This arrangement results in the loading drum being moved in a manner dependent on the forces exerted by the rotating tire whereby forces may be measured by appropriately placed measuring devices. In a sophisticated force variation machine (FVM), such as a Model No. D70LTW available from the Akron Standard Co. of Akron Ohio. The force measurements are interpreted by a computer and rubber is removed from the tire tread by grinders controlled by the computer. Examples of these methods are disclosed for example in U.S. Pat. Nos. 3,739,533, 3,946,527, 4,914,869, and 5,263,284.

As illustrated by prior patents and commercial devices, as described above, efforts are continuously being made to more efficiently correct tire non-uniformity. None of these prior art efforts, however, suggest the present inventive combination of method steps and component elements arranged and configured for correcting the conicity parameter, as well as the order of the routine for correcting variations in lateral forces, followed by radial run-out and finally radial forces as disclosed and claimed herein. Prior methods and apparatus do not provide the benefits of the present invention which achieves its intended purposes, objectives and advantages over the prior art devices through a new, useful and unobvious combination of method steps and component elements, through no increase in the number of functioning parts, at a reduction in operational cost, and through the utilization of only readily available materials and conventional components.

It is an object of the present invention to provide a method for correcting or shifting the conicity value in combination with improving radial run-out, radial force variation, and lateral force variation characteristics of a pneumatic tire to obviate the problems and limitations of the prior art methods. Other objects of this invention will be apparent from the following description and claims.

SUMMARY OF THE INVENTION

In accordance with the invention, there is provided a method for correcting or shifting the conicity value of a tire. To determine the conicity, the average lateral force exerted on the load wheel of a force variation machine by the tire turning in both the clockwise and counterclockwise direction is determined and analyzed with a computer program. The computer program then checks or scans a number of preset variables to determine if the conicity needs to be altered. These preset variables include the type of tire, the rate of conicity change for a specific type of tire, and the amount of power used by the motor turning the grinding wheel. The computer then calculates the difference between the actual value of the measured conicity and a specified conicity range or target conicity value. If the actual value of the conicity is within a first specified range, the conicity grind is discontinued and additional corrective grinding procedures are initiated. If the actual conicity is outside of the first specified range but within a second specified range extending above and below the first specified range, the tire is ground to a conicity value within the first specified range. Finally, if the actual conicity is outside of the second specified range, the tire is discarded. While the tire can be ground to within a specified range, it can also be ground to a specific conicity value.

In the case where the tire is to be ground, the computer determines the direction of conicity shift desired and the proper grinder with which to perform the grind. The computer next calculates the amount of time to grind and signals the selected grinder to move into position against the tire. While the selected grinder grinds the surface at a specified power for the determined length of time, the power used by the selected grinder is kept at the specified power level. After the selected grinder has engaged the tire for a determined length of time, the grinder is moved away from the tire and the computer routine is rerun to test the tire and determine the conicity value after the grind. If the computer determines that a further conicity shift is required, the program repeats and another grind is performed.

Further according to the invention, subsequent to the conicity grind, the tire is subjected to three consecutive, corrective grind routines; the lateral force variation corrective grind; the radial run-out corrective grind; and finally, the radial force variation corrective grind. The order of these corrective grinds is an important feature of the present invention.

In accordance with one embodiment of the invention, the grind routine can be used to control a center grinder apparatus to grind a central region of the tire tread between the shoulders of the tire tread to correct for conicity.

In accordance with another embodiment of the invention, an alternative conicity grind routine is used in combination with a force variation machine with shoulder grinders. The grind routine utilizes a feedback control loop to grind the tires to a desired value of counter-clockwise lateral shift. The computer controls one of the shoulder grinders to grind a shoulder of the tire until the value of the average lateral force in the counter-clockwise direction is above or below a calculated target counter-clockwise lateral shift value. Since the construction of the force variation machine requires that all grinding occur only when the tire is rotating in the counter-clockwise direction, the counter-clockwise lateral shift is measured and adjusted to shift the conicity value during grinding of the tire. The grind routine can incorporate simultaneous grinding and measuring of radial run-out, radial force variation, and/or lateral force variation characteristics of the tire.

BRIEF DESCRIPTION OF THE DRAWINGS

The structure, operation, and advantages of the presently preferred embodiment of the invention will become further apparent upon consideration of the following description taken in conjunction with the accompanying drawings, wherein:

FIG. 4, illustrate a flow diagram of the operation of a second embodiment of the invention wherein a feedback loop is incorporated into the program for correcting the tire.

DETAILED DESCRIPTION OF THE INVENTION

Figure 1:
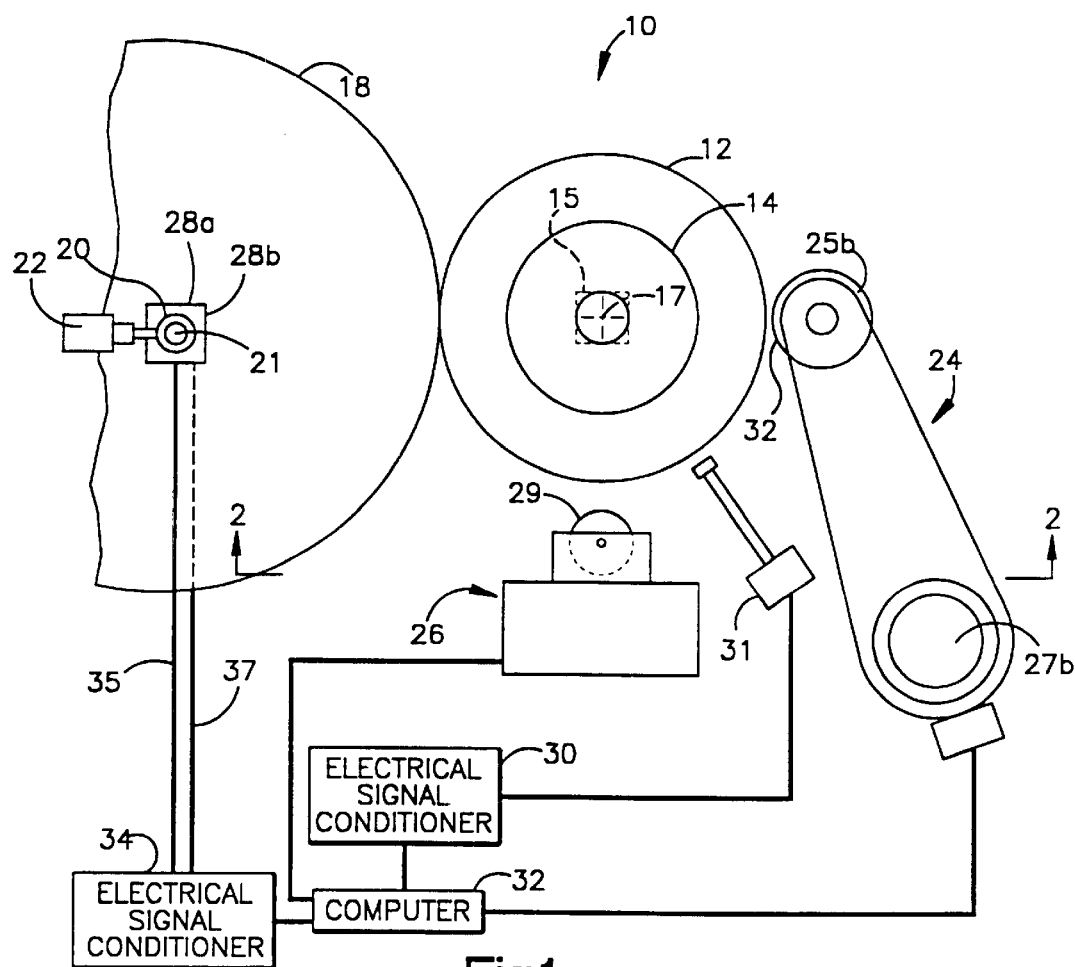
FIG. 1 is a schematic illustration of a top view of a force variation machine with a tire mounted thereon in accordance with the invention.
Figure 2:
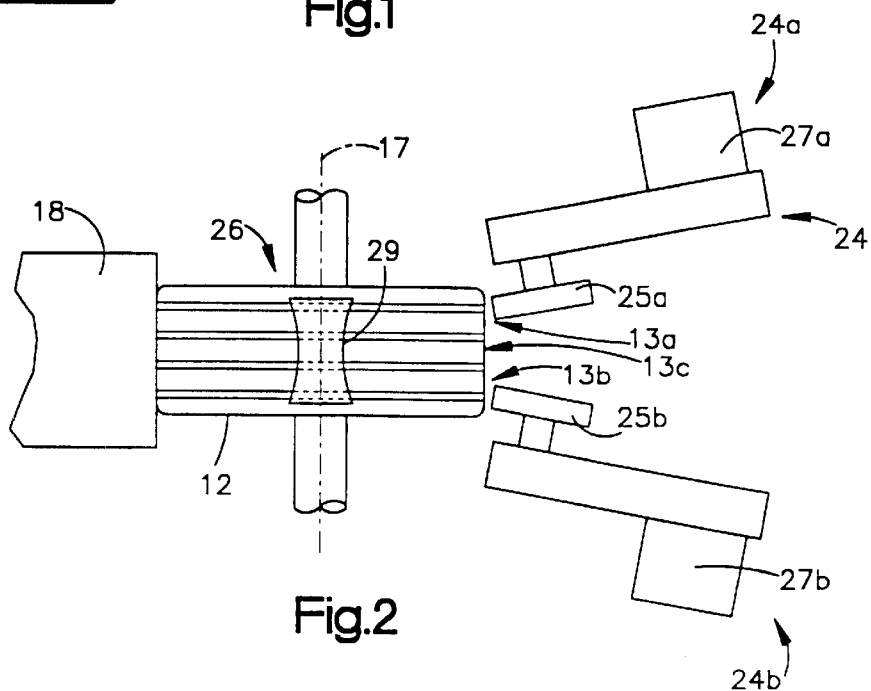
FIG. 2 is a side view through line 2—2 of FIG. 1 illustrating the relative location position of shoulder and center grinder assemblies.

Referring to FIGS. 1 and 2, there is illustrated a typical tire uniformity machine (TUM) 10, also known as a force variation machine (FVM), adapted for balance screening a tire 12 mounted within the machine. Tire 12 is typically a pneumatic tire having a circumferential tire tread with top and bottom shoulder regions 13a and 13b and a central region 13c between the top and bottom shoulder regions. The tire 12 can be mounted on a rim 14 secured to a tire spindle and inflated to a desired pressure, for example about 30 pounds per square inch (psi). A variable speed motor 15 (shown in phantom lines) rotates the tire spindle and rim 14 about axis 17. The tire 12 can be placed under load by a load wheel 18, which is rotatably supported on a spindle extending through the load wheel. During the testing of the tire for non-uniformities, the load wheel is pressed against the tire to load the inflated tire with a specified force (for example, 600 to 1900 pounds) to simulate road conditions and against which the tread of the tire rotates. Bearing blocks 20 are mounted to a carriage (not shown) which supports the ends of the spindle 21 on either side of the load wheel and are movable by conventional means, such as an electric motor 22 operating through a ball-and-screw connection, to move the load wheel 18 into and out of engagement with the tire 12. A shoulder grinding assembly 24 is located substantially 180° with respect to tire 12 from load wheel 18. The shoulder grinding assembly 24 includes substantially identical top and bottom shoulder grinders 24a and 24b, which include grinding wheels 25a and 25b, respectively, that are powered by motors 27a and 27b and are independently moved into and out of engagement with the shoulder regions 13a and 13b, respectively. The top and bottom shoulder grinders 24a and 24b can be moved into and out of engagement with the shoulder portions by any conventional means, such as hydraulic servo devices (not shown). A center grinder assembly 26 is located approximately 90° counter-clockwise (CCW) from load wheel 18. The center grinder assembly 26 has a grinding wheel 29 that is powered by a motor and is moved into and out of engagement with the central region 13c of the tread by conventional means, such as with an hydraulic servo device (not shown).

Conventional radial and lateral load cells 28a, 28b are mounted on spindle 21 with load wheel 18 suspended therebetween. The radial and lateral load cells 28a, 28b are typically used to measure the lateral and radial forces transmitted from the tire 12 as it rotates against the load wheel. The radial and lateral load cells 28a, 28b are typically used to measure the lateral and radial forces transmitted from the tire 12 as it rotates against the load wheel 18. Each of the load cells 28a, 28b includes a lateral load cell section conventionally used to measure the lateral force exerted by the tire 12 against load wheel 18 in a direction parallel to the axis of rotation extending about which the load wheel rotates. The load cells 28a, 28b also include a radial load cell section conventionally used to measure the radial force at the point of intersection of the tire 12 and the load wheel 18 exerted by the tire 12 against the load wheel 18 and through spindle 21 about which the load wheel rotates.

Voltage signals, proportionate to the magnitude of the radial and lateral forces, are generated by load cells 28a, 28b and inputted through lines 35 and 37, respectively, into an electric signal conditioner 34, which converts the force measurement voltage signals generated by the load cells 28a, 28b into signals which can be inputted to and stored in a computer 32. The electric signal conditioner 34 includes radial top and lateral top amplifiers (not shown) connected by line 35 to load cell 28a and radial bottom and lateral bottom amplifiers (not shown) connected by line 37 to load cell 28b.

A radial run-out transducer 31, shown in FIG. 1, is positioned on or adjacent the tread surface of tire 12 for sensing the variations in the tread diameter around the tire's circumference. The transducer 31 outputs the run-out signal through a signal conditioner 30 to computer 32. While a single transducer 31 is illustrated, it is within the terms of the invention to position a separate transducer against each shoulder region 13a and 13b and against the center region 13c of the tire tread so that the run-out of each shoulder and the center region can be checked independently. It is also within the terms of the invention to locate the transducer 31 in spaced relation from the tread to measure the run-out without contacting the tire.

The computer 32, conventionally programmed to determine the conicity, lateral force values, radial run-out, and radial force values of the tire 12, and to control the corrective grinding action to take is connected to the shoulder grinding assembly 24 and to the center grinder assembly 26 to position and operate the grinding assemblies, as required. Computer 32 stores the electrical signals received from the signal conditioners 30 and 34 and assigns a force value to each of a large number of increments of the tire circumference. Typically, the tire is indexed into a series of either 120 or 360 circumferential increments of equal length. Each of the increments includes the top and bottom shoulder regions 13a, 13b and the central tread region 13c extending between the top and bottom shoulder regions. Thus, in the case of 120 increments, each corresponds to a 3.0° arc of the tread, and with 360 increments, each corresponds to a 1.0° arc of the tread. Prior to testing, the tire is warmed by rotating at a preset speed, i.e. 60 RPM, for a specified period of time until the tire is at the testing temperature.

The computer 32 is programmed to determine whether the differences in the force values of the various increments are above or below a first set of chosen limits. In the event that the force values of the various increments are above or below the first set of chosen limits, the force values are compared to a second set of chosen limits which are above and below the first set of chosen limits, respectively. In the event the force value is above or below the second set of chosen limits, the tire is scrapped. Two sets of chosen limits are used for conicity, lateral force values, radial run-out, and radial force values. When any of the force values of the tire are outside the first set of chosen limits and inside the second set of chosen limits, computer 32 determines the corrective grinding action to take, as discussed in more detail below. Based on this information, computer 32 sends commands to the shoulder grinding assembly 24 or the center grinder assembly 26 to position the grinding assemblies, as required.

Prior to testing a tire for conicity, the tire is characterized as a type 1 or type 2 tire. Type 1 and type 2 represent a predetermined tire characteristic which gives the computer information about how to control the grinders. The corresponding automatic grinder control are as follows. Type 1 tires react to corrective grinding for conicity so that the top shoulder grinder 24a will cause a positive shift in the conicity value and the bottom shoulder grinder 24b will cause a negative shift in the conicity value. Type 2 tires react to corrective grinding so that the top shoulder grinder 24a will cause a negative shift in the conicity value and the bottom shoulder grinder 24b will cause a positive shift in the conicity value.

The Conicity Grind Routine

Conicity is a calculated value of a tire which indicates the direction and magnitude of pull a tire will exhibit as it rolls. In the conicity grind routine, there are two cycle configurations for correcting or shifting the conicity value of tire 12 to within a selected range by removing rubber from either top or bottom shoulder region 13a or 13b (see FIG. 2) of tire 12, depending on the type of tire (type 1 or 2). The first configuration causes FVM 10 to grind a tire to within a specified conicity range. This feature is activated through the computer software in computer 32 for either type 1 tires or for type 2 tires. The second configuration causes FVM 10 to grind a tire to a specific target conicity value. This feature is also activated through computer 32 for type 1 tires and for type 2 tires. The computer program activates the conicity grind routine based on the cycle configuration selected.

In one embodiment of the invention, the conicity grind routine is a time based grind. The conicity grind routine activates the shoulder grinding assembly 24 to grind the tire in order to change the lateral shift parameter and effect the conicity value of the tire.

To determine the conicity, the lateral load cells 28a, 28b measure the lateral force exerted on the load wheel 18 by first rotating the tire 12 in the clockwise (CW) direction. For each segment (typically 1.0°) into which the tire has been divided, a lateral force value is inputted through signal conditioner 34 into computer 32. The computer calculates an average lateral force (LFCW) or lateral shift (LSCW) value in the CW direction by adding each of the forces and dividing by the number of forces added. Then tire 12 is rotated in the counter-clockwise (CCW) direction and the average lateral force (LFCCW) or lateral shift (LSCCW) is calculated in the same manner. By using the following equation, the conicity is determined.

$$\text{Conicity } (CV) = [LSCW - ABS(LSCCW)]/2$$

Cv=Conicity value
LS=Lateral shift (average lateral force)
CW=Clock-wise direction
CCW=Counter clock-wise direction
ABS=Absolute value For mathematical purposes, the lateral shift in the CW direction has a positive value and the lateral shift in the CCW direction has a negative value. Therefore, the absolute value of the LSCCW is used in the equation. The conicity (also known as the conicity value) can be positive or negative. A positive value of conicity pulls the tire being tested in one direction, whereas a negative value of conicity pulls the tire being tested in the opposite direction. The larger the magnitude of the conicity value, the more the tire will pull in that direction.

It is important to note that the values of lateral shift in the CW and CCW directions, used to compute conicity, are each a single average value (typically in pounds). The lateral shift is not related to the lateral force variation. Lateral force variation is a series of incremental values which form a complex wave form used in the prior art for correcting tires for lateral force variations. The lateral force variation wave form is generated as follows. After the lateral forces at each segment are determined with the tire rotating in the CW direction, the values are inputted into the computer 32. The computer 32 calculates the average value of all the lateral force inputs in the clockwise direction. This average value is called the lateral shift. Then, the average value of the lateral forces in the CW direction is subtracted from the lateral force at each segment and a plot is generated. This plot is a complex lateral force variation wave form which corresponds to the lateral force variation in the CW direction. The same procedure is applied to a tire rotating in the counter-clockwise direction to generate a plot of the complex lateral force variation wave form in the CCW direction. The resulting lateral force variation wave forms in the CW and CCW directions are used to grind a tire to correct for lateral force variations, for example, first, second and third harmonics, as is generally known in the prior art.

There are four settings in the computer program being run in computer 32 which control the conicity grind routine. The first setting activates FVM 10 to grind a tire to within a specific conicity range or to a specific target conicity value for type 1 or type 2 tires as previously explained. The second setting is the specific range or target value of conicity desired. The third setting is a grind rate variable which is the number of lb/sec the conicity grind routine is capable of changing in the tire. The fourth setting is the desired grinder power.

Figure 3:
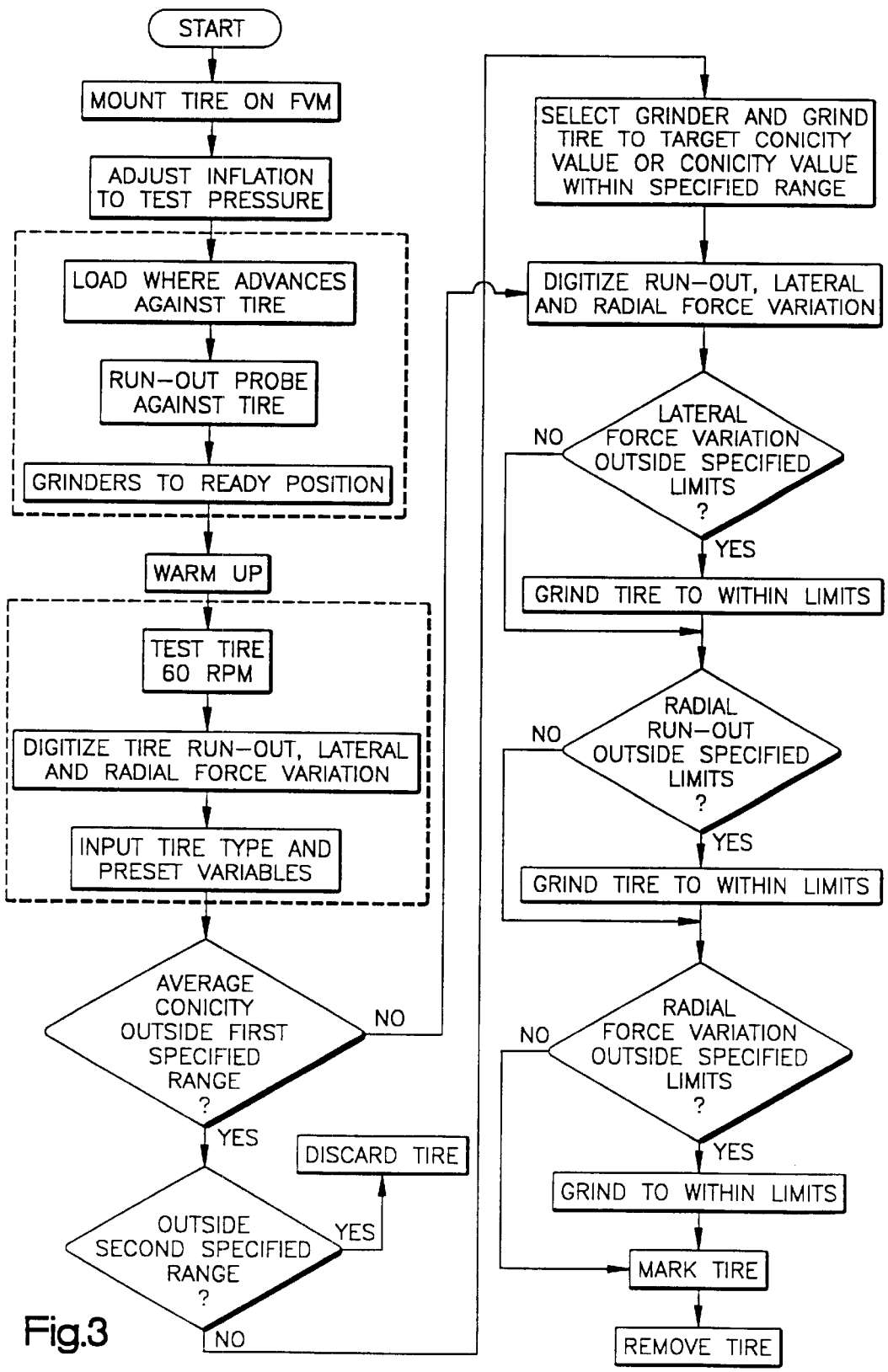
FIG. 3 illustrates a flow diagram of the operation of a first embodiment of the invention wherein shoulder grinders are used to correct the tire.

The routine for testing a tire, as shown in FIG. 3, is to mount the tire 12 being tested on the FVM 10 and to adjust the tire inflation. Then, the load wheel 18 is advanced against the tire. Run out probe 31 is positioned near or against the tire 12 and the grinder assemblies 24 are disposed in the ready position, as shown in FIGS. 1 and 2. The tire is rotated at about 60 RPM to warm up the tire so as to simulate road conditions. Next, the tire is rotated to digitize the tire. Continuing, the tire is rotated in both the clockwise (CW) and counter clockwise (CCW) directions to measure and generate the total lateral force wave form and total radial force wave form, the run-out, and other parameters in digitized form, as required. Based on this information, the computer calculates the conicity value, as discussed in more detail below. The routine then scans a number of preset variables, previously input into the computer, to determine if the conicity of the tire needs to be altered. These preset variables include the type of tire, the rate of conicity change for a specific type of tire, and the specified power window, i.e. the amount of power used by the motor turning the grinding wheel to grind the tire. The computer 32 then determines the difference between the actual value of conicity and a first specified conicity range or target conicity value. If the actual value of conicity is within the first specified range, the conicity grind is discontinued and additional corrective grinding procedures are initiated. Likewise, if the actual conicity is outside of the first specified range but within a second specified range extending above and below the first specified range, the tire is ground to a target conicity value or a conicity value within the first specified range. Finally, if the actual conicity is outside of the second specified range, the tire is discarded.

Conicity Grind Routine With Shoulder Grinders

Depending on the type of tire, the computer 32 determines the direction of conicity shift desired and the proper shoulder grinder, i.e. top or bottom grinder 24a, 24b, respectively, with which to perform the grind. The computer 32 calculates the absolute value of the difference between the actual conicity value and the specified range or target conicity value and divides it by the grind rate variable to determine the amount of time to grind. The computer 32 then signals the selected top or bottom shoulder grinder 24a or 24b, respectively, and moves it into position against the tire. Next, the selected shoulder grinder grinds the surface at a specified power for a determined length of time. The amount of power used by the motor running the selected grinder is updated in the computer after every revolution of the tire. During operation, the power used to operate the motor running the selected grinder is initially set at a low value. As the grind cycle continues, the grinder is moved into the tire in conjunction with compensating means that insure that the power level operating the grinder is maintained. Once the selected grinder has engaged the tire for a predetermined length of time, the grinder is moved away from the tire and the computer routine is rerun to test the tire in both the clockwise (CW) and counter clockwise (CCW) directions to determine the conicity value after the grind. If computer 32 determines that a further conicity shift is required, the program repeats and another grind is performed. Preferably, after the conicity grind has been carried out twice, the other grind routines are initiated in the specific order described below. It is however, within the scope of the invention, to repeat the conicity grind routine more than two times if desired. During the grinding procedure, the idle shoulder grinder maintains a non-functional minimum power position.

Using symbols, the previous procedure to effect the conicity grind routine is described for using either the top or bottom shoulder grinders 24a, 24b, respectively, to perform a conicity grind on a pneumatic tire. The procedure uses the following symbols:

LSCW=Lateral shift (average lateral force) of tire rotating in clockwise direction LSCCW=Lateral Shift (average lateral force) of tire rotating in counter-clockwise direction ABS=(−1) to shift from negative value to positive value CV=Actual conicity or conicity value of tire NCV=Absolute conicity value $SCV_1$=Specified acceptable conicity value below which tire is ground $SCV_2$=Specified acceptable conicity value above which tire is ground $SCV_3$=Specified conicity value below which the tire is not ground $SCV_4$=Specified conicity value above which the tire is not ground CLIM=Preset specified range (between $SCV_1$ and $SCV_2$) of conicity values where tire conicity is acceptable and doesn't require grinding PREP=Pre-position distance of grinding wheel of selected shoulder grinder with respect to tire being tested LIM=Preset conicity value between $SCV_1$ and $SCV_2$ NLIM=Absolute value of preset conicity value (LIM)

CGV=Conicity grind value NLIM-NCV

CGEC=Conicity grind ease constant is the measure of change (in weight) of conicity for a specific type of tire in a given time interval from grinding rubber from the tire with a shoulder grinder driven by a motor at a defined power level RGT=Required grind time GCPC=Grind current parameter constant corresponding to the electric current the motor powering the selected shoulder grinder will reach and maintain in a "surface following" grind for conicity Conicity Grind Procedure 1. Index the tire tread of the tire being tested into a series of circumferential increments, each of the increments including the opposite shoulder regions of the tire tread.
2. Measure LSCW corresponding to the series of circumferential increments of the tire tread.
3. Measure LSCCW corresponding to the series of circumferential increments of the tire tread.
4. Calculate CV with the following equation:

$$CV=[LSCW-Abs(LSCCW)]/2.$$

5. Compare CV to CLIM. If CV is within a first preset range of $SCV_1$ through $SCV_2$, discontinue conicity grind procedure and initiate other grind procedures. If CV is outside of a second preset range of $SCV_3$ through $SCV_4$, discontinue conicity grind procedure and initiate other grind procedures. If CV is within a third preset range of $SCV_2$ and $SCV_4$, or a fourth preset range of $SCV_1$ and $SCV_3$, go to step 6.

6. Pre-position (PREP) top and bottom shoulder grinders of grinder apparatus by following steps:
   a) Input whether tire being tested is a Type 1 or Type 2 tire.
   b) If Type 1 tire and CV in range $SV_2$ through $SV_4$, PREP bottom shoulder grinder. If Type 1 tire and CV in range $SV_1$ through $SV_3$, PREP top shoulder grinder. If Type 2 tire and CV in range $SV_2$ through $SV_4$, PREP top shoulder grinder. If Type 2 tire and CV in range $SV_1$ through $SV_3$, PREP bottom shoulder grinder.

7. Calculate the conicity grind value (CGV) which equals the difference (in units of weight) between the absolute preset conicity value and the actual conicity value of the tire, i.e. the difference between NLIM and NCV.

8. Input the CGEC (a preset, conicity grind ease constant which is a parameter specific to the tire type which measures the amount (in weight) of conicity that will be removed from a tire of the type being tested in a one second time interval while grinding at a preset GCPC).

9. Calculate the required grind time (RGT) for grinding said selected one of said shoulder regions of the tire being tested with the following equation:

$$RGT = \frac{CGV}{CGEC}$$

10. Input GCPC.

11. Initiate surface following conicity grind with selected shoulder grinder against selected shoulder of the tire while maintaining the GCPC for the determined RGT.

12. Upon completion of conicity grind, retract the selected shoulder grinder from PREP.

13. Retest the tire to determine whether CV of tire being tested is within the preset conicity range CLIM ($SCV_1$ through $SCV_2$).

14. If CV is outside of preset conicity range CLIM, rerun conicity grind procedure.

15. If conicity within preset conicity range CLIM, discontinue conicity grind routine.

While the preceding procedure is described for correcting the conicity of a tire to a value within a preset conicity range CLIM, it is also within the terms of the invention to correct the conicity of a tire to a specific conicity value.

The conicity grind routine is operated with the tire turning in the CCW direction. The routine can affect the average lateral force or lateral shift of the tire when altering the conicity value. The change in the tire surface caused by the conicity grind can also affect the radial force composite waveform because the grind follows the surface of the tire. The conicity grind routine randomly effects radial force variation (RFV) and lateral force variation (LFV). REV and LFV can increase or decrease based on the specific wave forms of the tire. Any effect on force variation by conicity grind is unintentional and simply a by-product of grinding the tire.

Grinding a tire for RFV and LFV does not typically cause a significant change in the conicity value of the tire. This can be attributed to the fact that the conicity grind is determined by average lateral force, and not the variation in the composite waveform of the tire. However, in some instances, the conicity value can be randomly effected by a RFV or LFV grind.

An important aspect of the invention is that the grinding of a tire for conicity generally affects both LFV and RFV. Therefore, the conicity grind initiates the overall grinding cycle, followed by the LFV grind, the RFV grind, and the run-out grind, as described herein.

Additional Corrective Grinding Procedures

Subsequent to the conicity grind, the tire is subjected to three consecutive, corrective grind routines; the lateral force variation (LFV) corrective grind; the radial run-out corrective grind; and finally, the radial force variation (RFV) corrective grind. The order of these corrective grinds is an important feature of the present invention.

Lateral Force Variation Corrective Grind

Subsequent to the conicity grind routine, the FVM is programmed to perform a corrective grind for excessive lateral force variations caused by tire non-uniformity. Lateral force variation occurs due to a variation in the pull of the tire from left to right as the tire rotates against the load wheel. Lateral force variation creates a series of moments along the axis of rotation of the tire.

As described before, the lateral load cells 28a, 28b supporting load wheel 18 take force readings at incremental units of degrees as the tire rotates through one (1) revolution in both the CW and CCW directions. The incremental force readings generate a complex sine wave referred to as the lateral force variation waveform. Then, the lateral force variation waveform is mathematically displaced with the average of all the incremental force readings. This displacement, known as a lateral shift, is subtracted from each force measurement by the computer program and a lateral force variation waveform for the direction of rotation of the tire is generated. It is important to note that only the peak values of the complex sine wave, occurring after the average lateral force has been subtracted from the complex sine wave, are corrected for in the lateral force variation grind. The average lateral force present in the tire is ignored with respect to the lateral force variation grind.

Because the lateral force variation waveform is a complex sine wave, it can be broken down into harmonics of the complex wave. Typically, the primary concern is with the first force variation harmonic. The lateral force variation waveform forms a control function input to operate the grinder apparatus. The control function input from computer 32 to the top and bottom shoulder grinder assemblies 24a and 24b is the signal input equivalent of the lateral force variation complex waveform. The top and bottom shoulder grinders 24a and 24b, respectively, are used to grind for lateral force variation.

Because of the nature of lateral force variation and its relation to the tire, the top and bottom shoulder grinder assemblies 24a and 24b, respectively, grind to the same input control function. This control function requires the grinder assemblies to grind at separate points around the circumference of the tire. The top and bottom shoulder grinder assemblies 24a and 24b, respectively, pulse into the tire as required by the control function to decrease the lateral force variation.

Radial Run-Out Corrective Grind

Subsequent to the lateral force variation grind, FVM 10 is programmed to perform a corrective grind for excessive radial run-out. Radial run-out is an intrinsic tire non-uniformity, best described as the "out of roundness" of the tire. Radial run-out is measured by the probe assembly 31 shown in FIG. 1. The probe assembly 31 measures the distance between the tread and the radial run-out probe at incremental units around the circumference of the tire as the latter rotates through one (1) revolution. The output of probe assembly 31 is sent through electrical signal conditioner 30 to computer 32. Computer 32 then outputs control signals to center grinder assembly 26. The center grinder assembly 26 is pre-positioned and then hydraulically servo-positioned into tire 12 at incremental units of distance. As center grinder assembly 26 is servo positioned against the tire, the radial run-out high points are removed. Center grinder apparatus 26 continues to be servo positioned in against the tire to perform a lathe type grind on the tire until probe assembly 31 measures a distance variation that is within the specified tolerance for the tire.

Radial Force Variation Corrective Grind

After the radial run-out grind, FVM 10 is programmed to grind the tire to reduce radial force variation, an intrinsic tire non-uniformity. Radial force variation occurs due to a variation in the stiffness of the tire around its circumference and about the tires center of rotation.

The radial load sections of load cells 28a, 28b take force readings at incremental units of degrees as the tire 12 rotates through one (1) revolution. It is important to note that the load on the tire 12 is subtracted from the force readings of the load cells 28, leaving only the variation in force around the circumference of the tire as it rotates through one (1) revolution. The incremental force readings form a complex sine wave referred to as the radial force variation waveform.

Because the radial force variation waveform is a complex sine wave, it can be broken down into harmonics of the complex wave. Typically, only the first, second, and third radial force variation harmonics are of concern. Data describing the radial force variation waveform is transferred to computer 32 which transforms the complex sine wave into a control function input for shoulder grinder apparatus 24. Only the top and bottom shoulder grinder assemblies 24a and 24b, respectively, are used to grind for radial force variation. The control function input from computer 32 to the top and bottom shoulder grinder assemblies 24a and 24b is the signal input equivalent of the radial force variation complex waveform.

Regarding the radial force variation corrective grind, only the complex sine wave (radial force variation waveform) is ground. Further, the top and bottom shoulder grinder assemblies 24a and 24b grind in unison to the same input control function. They do not operate independently when grinding to correct for radial force variation.

Conicity Grind Routine with Center Grinder

While the first embodiment described above is directed to using the shoulder grinder apparatus 24 to correct the tire for conicity, the conicity grind cycle can also utilize the center grinder apparatus 26 to correct a pneumatic tire for conicity based on the following procedure.

The following procedure is required for use of the center grinder apparatus 26 to perform a corrective conicity grind on a pneumatic tire. The procedure uses the same symbols as with the shoulder grinder apparatus described before.

Conicity Grind Procedure

1. Indexing the tire tread of the tire being tested into a series of circumferential increments, each of the increments including the center region and the opposite shoulder regions of the tire tread.
2. Measure LSCW corresponding to the series of circumferential increments of the tire tread.
3. Measure LSCCW corresponding to the series of circumferential increments of the tire tread.
4. Calculate CV with the following equation:

$$CV = [LSCW - ABS(LSCCW)]/2.$$

5. Compare CV to CLIM. If CV is within first preset range of $SCV_1$ through $SCV_2$, discontinue the conicity grind procedure and initiate other grind procedures. If CV is outside of a second preset range of $SCV_3$ through $SCV_4$, discontinue conicity grind procedure and initiate other grind procedures. If CV is within a third preset range of $SCV_2$ and $SCV_4$, or a fourth preset range of $SCV_1$ and $SCV_3$, go to step 6.
6. Pre-position (PREP) center grinder apparatus with following steps:
   a) Inputting whether tire being tested is a Type 1 or Type 2 tire.
   b) If Type 1 tire CV in range $SV_2$ through $SV_4$, pre-positioning (PREP) center grinder apparatus to right away from default position at center region of tire tread. If Type 1 tire and CV in range $SV_1$ through $SV_3$, pre-positioning (PREP) center grinder apparatus to left away from default position at center region of tire tread. If Type 2 tire and CV in range $SV_2$ through $Sv_4$, pre-positioning (PREP) center grinder apparatus to left away from default position at center region of tire tread. If Type 2 tire and CV in range $SV_1$ through $SV_3$, pre-positioning (PREP) center grinder apparatus to right away from default position at center region of tire tread.
7. Calculate the conicity grind value (CGV) which equals the difference (in units of weight) between the absolute preset conicity value and the absolute value of the actual conicity value of the tire, i.e. the difference between NLIM and NCV.
8. Input the CGEC (a preset, conicity grind ease constant) which is a parameter specific to the tire type being tested which measures the amount (in weight) of conicity that will be removed from that specific type of in a one second time interval while grinding at a preset GCPC.
9. Calculate the required grind time (RGT) for the tire being tested using the following equation:

$$RGT = \frac{CGV}{CGEC}$$

10. Input GCPC.
11. Initiate a surface following conicity grind with center grinder against the center region of the tire while maintaining the GCPC for the determined RGT.
12. Upon completion of the conicity grind, retract the center grinder to its original position.
13. Retest the tire to determine whether CV of the tire being tested is within the preset conicity range CLIM ($SCV_1$ through $SCV_2$).
14. If CV outside of preset conicity range CLIM, rerun conicity grind procedure.
15. If conicity within preset conicity range CLIM, discontinue conicity grind routine.

Subsequent to completing the conicity grind routine with the center grinder, as needed, the cycle continues with grinding for lateral force variations, radial run-out, and radial force variations as discussed with regard to the first embodiment.

Alternative Conicity Grind Routine

While the conicity grind routine with shoulder grinders and/or center grinder described above is a satisfactory method of correcting conicity, an alternative conicity grind routine with shoulder and/or center grinders utilizes a feedback control loop to grind to a desired value of counter-clockwise lateral shift instead of performing a particular amount of grinding as determined by a calculated required grind time. In the alternative preferred embodiment of the invention, as shown in FIGS. 1, 2, 4 and 5, the computer 32 directs one of the shoulder grinders 24a, 24b to grind the corresponding shoulder 13a, 13b of tire 12 until the value of the average lateral force in the counter-clockwise direction (PLSCCW) is above or below, depending on the conicity value as explained below, a calculated target counter-clockwise lateral shift value (TLSCCW), which should cause the conicity of the tire to become acceptable. Because the construction of the FVM 10 requires that all grinding occur only when the tire 12 is rotating in the counter-clockwise direction, the counter-clockwise lateral shift is the parameter which is adjusted to shift the conicity value as only the lateral force values in the counter-clockwise direction can be measured by the load cells 28a, 28b during grinding of the tire.

To determine the conicity value (CV), the basic procedure outlined above for calculating the clockwise lateral shift (LSCW) and the counterclockwise lateral shift (LSCCW) is employed. Conicity is then calculated with the following alternative conicity equation:

$$\text{Conicity } (CV) = [LSCW + LSCCW]/2 - MCOS$$

where MCOS=Machine Conicity offset

For mathematical purposes, the lateral shift in the CW direction has a positive value and the lateral shift in the CCW direction has a negative value. Therefore, the magnitude of the first part of the equation is identical to the magnitude of the result obtained by the previous conicity calculation which subtracts the absolute value of LSCCW from LSCW. The machine conicity offset (MCOS) is a predetermined factor which makes the calculated value of conicity more accurate by accounting for misalignments, electrical offsets and other machine contributions that cause the measured lateral forces values to be incorrect. The MCOS is a constant which depends on the particular type of tire, typically called the tire code.

The alternative conicity grind routine is based on the following three concepts. First, it is assumed that the magnitude of the increase or decrease in the absolute value of the counter-clockwise lateral shift (LSCCW) will result in a corresponding decrease or increase, respectively, in the magnitude of the value of the clockwise lateral shift (LSCW). Second, whenever the conicity is a positive value greater than a maximum acceptable conicity, grinding the tire to decrease LSCW, and thereby increase LSCCW, will decrease the positive conicity value and the increasing value of LSCCW can be measured during grinding. Third, whenever the conicity is a negative value (the absolute value of which is greater than a maximum acceptable conicity), the tire 12 can be ground to decrease the absolute value of LSSCW, and thereby increase the value of LSCW to decrease the absolute value of the negative conicity value. The decreasing value of LSCCW can be measured during grinding.

The following example will illustrate the above concepts: If LSCW is initially measured at 100, LSCCW is initially measured at −50 (LSCCW is always negative) and assuming that MCOS is 0, the conicity is calculated to be [100−50]/2=+25. If the maximum acceptable conicity is +/−20, the value of the conicity must be decreased by 5 (from +25 to +20), in other words, a negative shift of 5. If the above assumption holds true, then an increase in the absolute value of LSCCW by 5, from −50 to −55, should decrease the magnitude of LSCW by 5, from 100 to 95, and the conicity will therefore decrease from the initial value of 25 to [95−55]/2=20. Thus, the tire 12 will be ground to decrease LSCW by 5, from +100 to +95, which will be determined by measuring an increase in the absolute value of LSCCW by 5, from −50 to −55.

The following principles, which were stated above in the description of the first embodiment, are repeated to explain the process by which computer 32 selects a particular shoulder grinder 24a, 24b to adjust the counter-clockwise lateral shift in the appropriate direction. Type 1 tires react to corrective grinding for conicity so that the top shoulder grinder 24a will cause a positive shift in the conicity value and the bottom shoulder grinder 24b will cause a negative shift in the conicity value. Type 2 tires react to corrective grinding so that the top shoulder grinder 24a will cause a negative shift in the conicity value and the bottom shoulder grinder 24b will cause a positive shift in the conicity value. Therefore, the following rules dictate which grinder 24a, 24b the computer 32 selects to perform the grinding routine:

Type 1 Tire:
  a) If the conicity is a positive value, bottom shoulder grinder 24b is selected to increase the absolute value of the LSCCW
  b) If the conicity is a negative value, top shoulder grinder 24a is selected to decrease the absolute value of the LSCCW Type 2 Tire:
  a) If the conicity is a positive value, top shoulder grinder 24a is selected to increase the absolute value of the LSCCW
  b) If the conicity is a negative value, bottom shoulder grinder 24b is selected to decrease the absolute value of the LSCCW In the alternative conicity grind routine, the routine for testing a tire 12, as outlined above, is followed before the conicity value of the tire is determined. Then, the computer 32 calculates the conicity value (CV) with the alternative conicity equation that adjusts for the machine contributions which cause the measured values of lateral force to be inaccurate. Next, the computer 32 determines the difference between the absolute value of conicity (NCV) and a target conicity value (TCV), which is the maximum acceptable amount of conicity of a tire which will be within preset specifications. The target conicity value is dependent on the tire type or tire code. If the absolute value of conicity is less than or equal to the target conicity value, the conicity grind routine is discontinued and additional corrective grinding procedures are initiated. If the absolute value of conicity is greater than the target conicity value but less than or equal to a maximum conicity value (MCV), which is the greatest conicity value which a tire may have and still be correctable, the tire is ground to a conicity value less than or equal to the target conicity value. Finally, if the absolute value of conicity is greater than the maximum conicity value, the tire is discarded as being uncorrectable.

Alternative Conicity Grind Routine with Shoulder Grinders

Figure 4A:
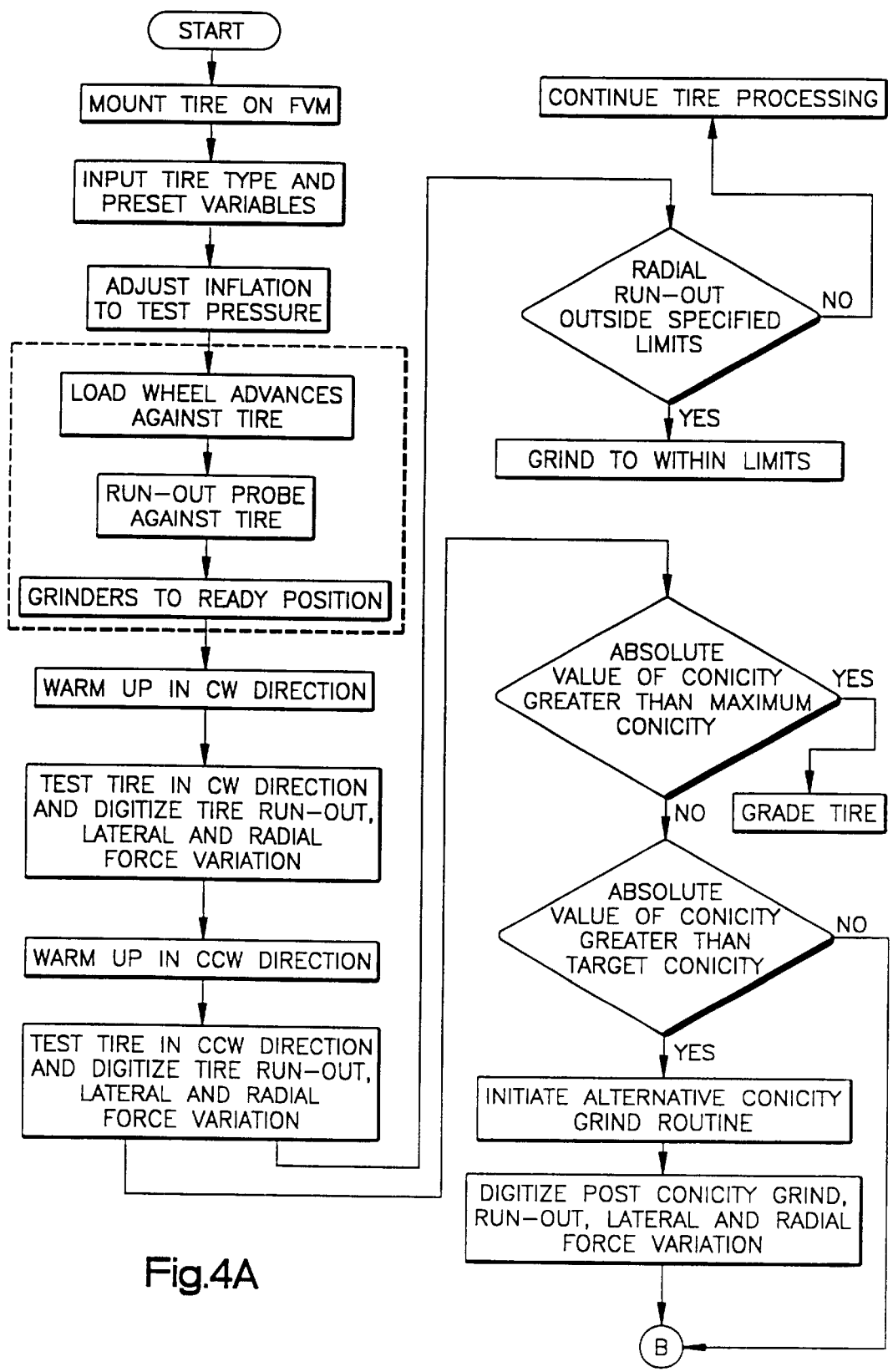
FIGS. 4A and 4B, collectively
Figure 4B:
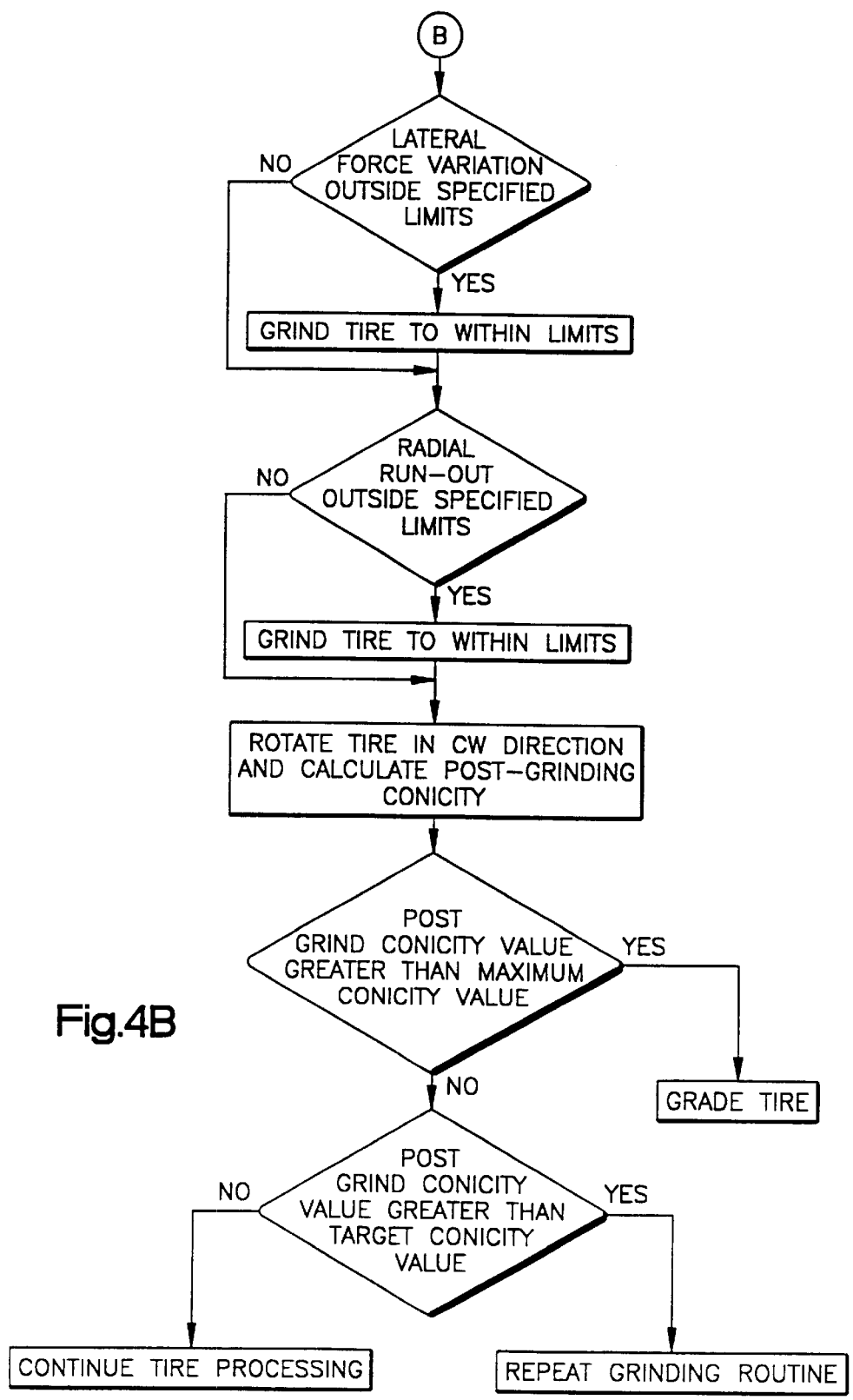
Figure 5:
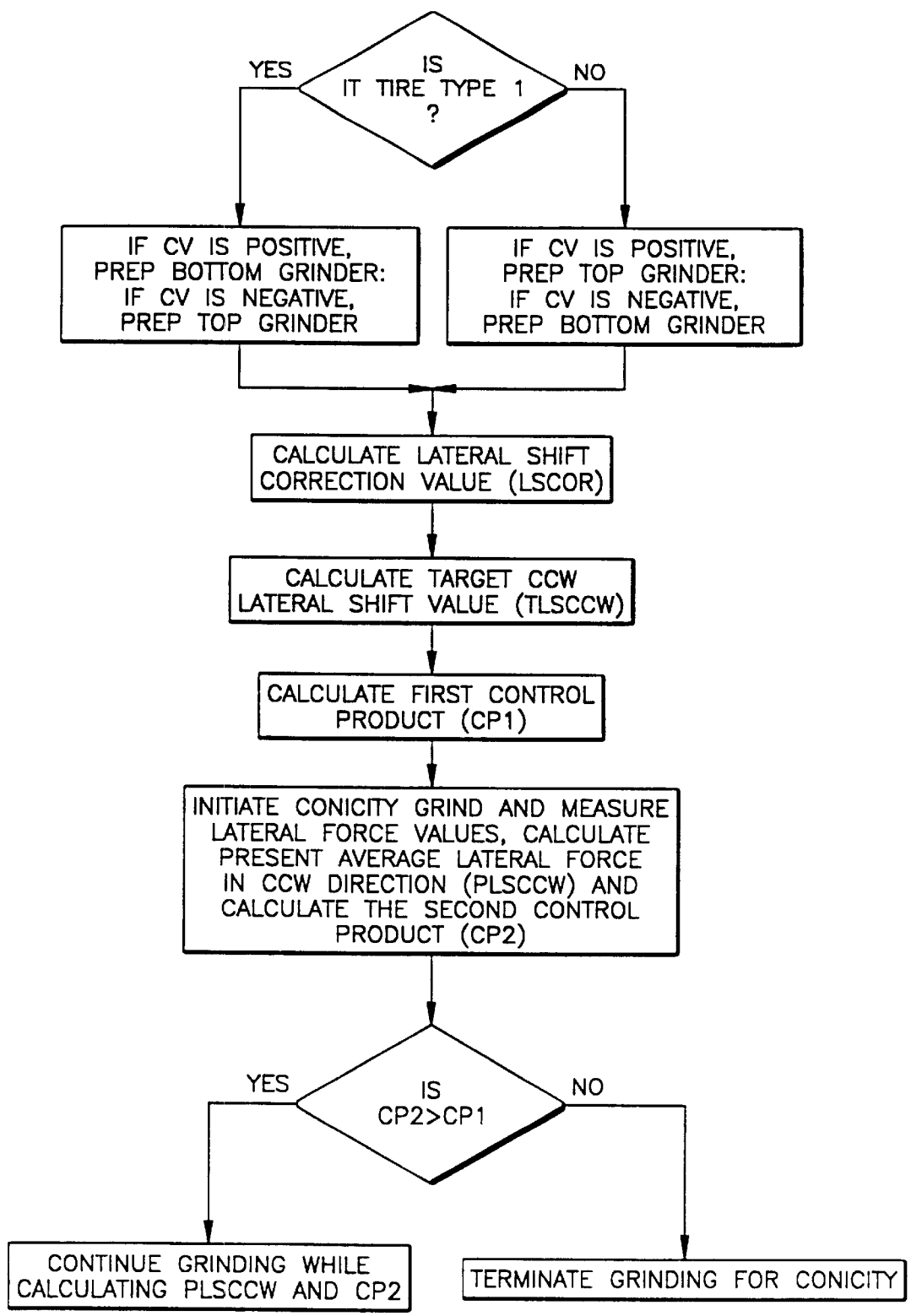
FIG. 5 illustrates a flow diagram of the operation of the second embodiment of the invention wherein the feedback loop is incorporated into the program for correcting the tire.

Referring to FIGS. 4 and 5, the alternative conicity grinding routine proceeds as follows. Depending on the type of tire, the computer 32 determines the direction of conicity shift desired and the proper shoulder grinder, i.e. top or bottom grinder 24a, 24b, respectively, with which to perform the grind. Then, the computer 32 calculates the lateral shift correction (LSCOR), which is the amount by which the counter-clockwise lateral shift is adjusted to reduce the conicity to a value equal to or less than the target conicity value. The lateral shift correction (LSCOR) is determined by the following equation:

$$LSCOR=NCV-TCV+COS$$

where NCV is the absolute value of conicity

TCV is the target conicity value

COS is the confidence offset (additional amount of average lateral force to be removed)

By grinding tire 12 with the appropriate grinder, the value of the counter-clockwise lateral shift (LSCCW) is either increased or reduced by the amount of the lateral shift correction (LSCOR) to make the conicity value (CV) of the tire less positive or less negative, respectively, and should cause the absolute value of the conicity value (NCV) to be less than or equal to the target conicity value (TCV). As stated previously, this method is based on the assumption that an increase or decrease in the counter-clockwise lateral shift (LSCCW) results in an equal corresponding decrease or increase, respectively, in the clockwise lateral shift (LSCW). Because this assumption does not always hold true, in that the clockwise lateral shift may not change by the same magnitude that the counter-clockwise lateral shift changes, a confidence offset (COS) is added to the lateral shift correction (LSCOR) to increase the likelihood that the absolute value of the conicity will be less than or equal to the target conicity value after the corrective grinding procedure is completed.

After determining the lateral shift correction (LSCOR), the program in computer 32 calculates a target counter-clockwise lateral shift value (TLSCCW), which is a value of LSCCW at which the conicity of tire 12 should be within acceptable limits. TLSCCW is calculated by the following equation:

$$TLSCCW=OLSCCW-[SNF \times LSCOR]$$

where OLSCCW is the original LSCCW measured before grinding (original LSCCW)

SNF is the sign factor of +1 when CV is positive and −1 when CV is negative

Computer 32 multiplies the target counter-clockwise lateral shift value (TLSCCW) by the sign factor (SNF) to obtain a first control product (CP1), the purpose of which is explained below. Then, the computer 32 causes the selected shoulder grinder 24a or 24b to be moved into a position whereby the grinding wheel 25a or 25b, respectively, is in contact with a top or bottom shoulder of tire 12. Next, the selected shoulder grinder grinds the surface of the shoulder of tire 12 at a specified power while the computer 32 continuously recalculates the present value of the average lateral force in the counter-clockwise direction (PLSCCW) from the lateral force measurements inputted by the lateral load cells of load cells 28a, 28b. Computer 32 multiples this present value of the average lateral force (PLSCCW) in the counter-clockwise direction by the sign factor (SNF) to obtain a second control product (CP2). Computer 32 continuously checks this second control product (CP2) against the first control product (CP1). The selected grinder 24a or 24b is maintained in grinding contact with the shoulder of tire 12 while the computer 32 determines that the following control statement remains true: CP2>CP1.

Computer 32 terminates the grinding when the computer program determines that the above control statement is false. Therefore, grinding is continued until the computer 32 determines that the present value of the average lateral force in the counter-clockwise direction (PLSCCW) is equal to or less than the target counter-clockwise lateral shift (TLSCCW) when CV is positive or is equal to or greater than TLSCCW when CV is negative. When PLSCCW is equal to or less than TLSCCW for a tire with a positive conicity value, the post-grinding conicity value (PGCV) should be equal to or less than the target conicity value (TCV). Likewise, when PLSCCW is equal to or greater than TLSCCW for a tire with a negative conicity value, the absolute value of the post-grinding conicity value (NPGCV) should be equal to or less than the target conicity value.

When the computer 32 terminates the grinding procedure, the selected shoulder grinder 24a or 24b is retracted from the tire to an initial position. Tire 12 is then rotated in the clockwise direction to calculate the post-grinding value of the clockwise lateral shift (PGLSCW). Next, the computer 32 calculates the post-grinding conicity value (PGCV) using PGLSCW and the final calculated present value of the average lateral force in the counter-clockwise direction (FLSCCW) for LSCW and LSCCW, respectively, in the alternative conicity equation. If the absolute value of the PGCV (NPGCV) is less than or equal to the target conicity value (TCV), the grind routine is discontinued. If NPGCV is greater than TCV, the computer 32 repeats the program and another grind procedure is performed. If too many tires 12 fail the initial grind procedure, the confidence offset (COS) can be set to a higher value to increase the likelihood that the absolute value of the post-grinding conicity value (NPGCV) will be less than or equal to the target conicity value (TCV) after the first grind procedure.

Using symbols, the previous procedure to effect the alternative conicity grind routine is described for using either the top or bottom shoulder grinders 24a, 24b, respectively, to perform a conicity grind on a tire. The procedure uses the following symbols:

LSCW=Lateral Shift (average lateral force) of tire rotating in clockwise direction LSCCW=Lateral Shift (average lateral force) of tire rotating in counter-clockwise direction MCOS=Machine conicity offset to account for machine contribution to lateral force measurements CV=Actual conicity or conicity value of tire NCV=Absolute value of the conicity value TCV=Target conicity value or the maximum acceptable conicity value MCV=Maximum conicity value or the conicity value above which the tire is discarded COS=Confidence Offset LSCOR=Lateral shift correction or the minimum amount by which LSCCW is reduced SNF=+1 when CV is positive and −1 when CV is negative PLSCCW=Present LSCCW measured during grinding TLSCCW=Target LSCCW or the LSCCW expected to result in a conicity value less than or equal to TCV OLSCCW=original LSCCW as measured before grinding FLSCCW=Final PLSCCW calculated during grinding PGLSCW=Post grind LSCW as measured after grinding PGCV=Post grind CV determined using FLSCCW and PGLSCW NPGCV=Absolute value of PGCV Alternative Conicity Grind Procedure 1. Index the tire tread of the tire being tested into a series of circumferential increments, each of the increments including the opposite shoulder regions of the tire tread.

2. Measure LSCW corresponding to the series of circumferential increments of the tire tread and assign it a positive value.
3. Measure LSCCW corresponding to the series of circumferential increments of the tire tread and assign it a negative value.
4. Calculate CV with the following equation:

$CV=[LSCW+LSCCW]/2-MCOS.$

5. Compare NCV to TCV and MCV. If NCV is at or below TCV, discontinue conicity grind procedure and initiate other grind procedures to correct for lateral force variation, and/or radial run-out, and/or radial force variations of the tire. If NCV is greater than TCV and less than or equal to MCV, go to step 6. If NCV is greater than MCV, discontinue grind routine and discard tire.
6. Pre-position (PREP) top and bottom shoulder grinders of grinder apparatus by following steps:
   a) Inputting whether tire being tested is a Type 1 or Type 2 tire.
   b) If Type 1 tire and CV is a positive value, PREP bottom shoulder grinder. If Type 1 tire and CV is a negative value, PREP top shoulder grinder. If Type 2 tire and CV is a positive value, PREP top shoulder grinder. If Type 2 tire and CV is a negative value, PREP bottom shoulder grinder.
7. Calculate the lateral shift correction value (LSCOR) with the following equation:

$LSCOR=NCV-TCV+COS.$

8. Calculate the target counter-clockwise lateral shift value (TLSCCW) with the following equation:

$TLSCCW=OLSCCW-[SNF \times LSCOR].$

9. Calculate the first control product (CP1) with the following equation:

$CP1=SNF \times TLSCCW$

10. Initiate surface following conicity grind with selected shoulder grinder against selected shoulder of the tire while continuously measuring lateral force values, calculating the present value of the average lateral force in the counter-clockwise direction (PLSCCW), and calculating the second control product (CP2) according to the following equation;

$CP2=SNF \times PLSCCW$

Continue grinding while the following equation is true:

$CP2>CP1$

When the equation becomes false, go to step 11.
11. Retract the selected shoulder grinder from PREP.
12. Rotate the tire clockwise and determine the post-grinding value of LSCW (PGLSCW). Calculate the post-grinding value of CV (PGCV) using the PGLSCW and the last calculated PLSCCW (FLSCCW) for LSCW and LSCCW, respectively, in the conicity equation of step 4.
13. If NPGCV is greater than TCV and less than MCV or equal to MCV, rerun conicity grind procedure.
14. If NPGCV is less than TCV or equal to TCV or greater than MCV, discontinue conicity grind routine.

While the proceeding procedure is described for correcting the absolute value of the conicity of a tire to a value below a target conicity value, it is also within the terms of the invention to correct the conicity of a tire to a specific conicity value.

The conicity grind routine is operated with the tire turning in the CCW direction. The routine can affect the average lateral force or lateral shift of the tire when altering the conicity value. The change in the tire surface caused by the conicity grind can also affect the radial force composite waveform because the grind follows the surface of the tire. The conicity grind routine randomly effects radial force variation (RFV) and lateral force variation (LFV). REV and LFV can increase or decrease based on the specific wave forms of the tire. Any effect on force variation by conicity grind is unintentional and simply a by-product of grinding the tire.

While grinding a tire for RFV and LFV does not typically cause a significant change in the conicity value of the tire, in some instances, the conicity value can be randomly effected by a RFV or LFV grind. While the conicity grind can be done independently, typically the conicity grind cycle is done along with the LPV or the RPV grind, and/or simultaneously with the run-out grind because the latter is independently ground with the center grinders. After a cycle of the LFV grind, the RFV grind and the conicity grind is finished, each of the RFV, the LFV and the conicity are recalculated or remeasured as necessary. The process continues until all of the parameters of conicity, LFV, RFV, and/or run-out are within specified tolerances or the tire is graded as being outside of the desired specifications. This enables the RFV grind, the LFV grind, the conicity grind, and/or the run-out grind to be adjusted to account for changes in the tire due to one of the other grinding procedures.

Additional Corrective Grinding Procedures

Along with the conicity grind, the tire is subjected to three corrective grind routines; the lateral force variation (LFV) corrective grind; the radial run-out corrective grind and the radial force variation (RFV) corrective grind. The order of these corrective grinds is not an aspect of this embodiment of the invention.

Lateral Force Variation Corrective Grind

Subsequent or simultaneous with the conicity grind routine, the FVM is programmed to perform a corrective grind for excessive lateral force variations caused by tire non-uniformity. Lateral force variation occurs due to a variation in the pull of the tire from left to right as the tire rotates against the load wheel. Lateral force variation creates a series of moments along the axis of rotation of the tire.

As described before, the lateral load cells 28a, 28b supporting load wheel 18 take force readings at incremental units of degrees as the tire rotates through one (1) revolution in both the CW and CCW directions. The incremental force readings generate a complex sine wave referred to as the lateral force variation waveform. Then, the lateral force variation waveform is mathematically displaced with the average of all the incremental force readings. This displacement, known as a lateral shift, is subtracted from each force measurement by the computer program and a lateral force variation waveform for the direction of rotation of the tire is generated. It is important to note that only the peak values of the complex sine wave, occurring after the average lateral force has been subtracted from the complex sine wave, are corrected for in the lateral force variation grind. The average lateral force present in the tire is ignored with respect to the lateral force variation grind.

Because the lateral force variation waveform is a complex sine wave, it can be broken down into harmonics of the complex wave. Typically, the primary concern is with the first force variation harmonic. The lateral force variation waveform forms a control function input to operate the grinder apparatus. The control function input from computer 32 to the top and bottom shoulder grinder assemblies 24a and 24b is the signal input equivalent of the lateral force variation complex waveform. The top and bottom shoulder grinders 24a and 24b, respectively, are used to grind for lateral force variation.

Because of the nature of lateral force variation and its relation to the tire, the top and bottom shoulder grinder assemblies 24a and 24b, respectively, grind to the same input control function. This control function requires the grinder assemblies to grind at separate points around the circumference of the tire. The top and bottom shoulder grinder assemblies 24a and 24b, respectively, pulse into the tire as required by the control function to decrease the lateral force variation.

Radial Force Variation Corrective Grind

After or before the lateral run-out grind, FVM 10 is programmed to grind the tire to reduce radial force variation, an intrinsic tire non-uniformity. Radial force variation occurs due to a variation in the stiffness of the tire around its circumference and about the tires center of rotation.

The radial load sections of load cells 28a, 28b take force readings at incremental units of degrees as the tire 12 rotates through one (1) revolution. It is important to note that the load on the tire 12 is subtracted from the force readings of the load cells 28, leaving only the variation in force around the circumference of the tire as it rotates through one (1) revolution. The incremental force readings form a complex sine wave referred to as the radial force variation waveform.

Because the radial force variation waveform is a complex sine wave, it can be broken down into harmonics of the complex wave. Typically, only the first, second, and third radial force variation harmonics are of concern. Data describing the radial force variation waveform is transferred to computer 32 which transforms the complex sine wave into a control function input for shoulder grinder apparatus 24. Typically the top and bottom shoulder grinder assemblies 24a and 24b, respectively, are used to grind for radial force variation. The control function input from computer 32 to the top and bottom shoulder grinder assemblies 24a and 24b is the signal input equivalent of the radial force variation complex waveform. However it is also within the terms of the invention to grind for radial force variation with the center grinder.

Regarding the radial force variation corrective grind, only the complex sine wave (radial force variation waveform) is ground. Further, the top and bottom shoulder grinder assemblies 24a and 24b grind in unison to the same input control function. They do not operate independently when grinding to correct for radial force variation.

Radial Run-Out Corrective Grind

Independent of the conicity grind, the radial force variation and the lateral force variation grind, FVM 10 is programmed to perform a corrective grind with the center grinder assembly 26 for excessive radial run-out. Radial run-out is an intrinsic tire non-uniformity, best described as the "out of roundness" of the tire. Radial run-out is measured by the probe assembly 31 shown in FIG. 1. The probe assembly 31 measures the distance between the tread and the radial run-out probe at incremental units around the circumference of the tire as the latter rotates through one (1) revolution. The output of probe assembly 31 is sent through electrical signal conditioner 30 to computer 32. Computer 32 then outputs control signals to center grinder assembly 26. The center grinder assembly 26 is pre-positioned and then hydraulically servo-positioned into tire 12 at incremental units of distance. As center grinder assembly 26 is servo positioned against the tire, the radial run-out high points are removed. Center grinder apparatus 26 continues to be servo positioned in against the tire to perform a lathe type grind on the tire until probe assembly 31 measures a distance variation that is within the specified tolerance for the tire.

It is apparent that there has been provided in accordance with this invention apparatus and methods for correcting or shifting the conicity value in a tire that satisfy the objects, means and advantages set forth hereinbefore. According to the invention, a method for correcting or shifting the conicity value in a tire with a feedback control loop to grind to a desired value of counter-clockwise lateral shift is used in combination with correcting for lateral force variation, and/or radial run-out, and/or radial force variation characteristics of a tire by grinding the tread surface. The correcting or shifting of the conicity value in a tire is accomplished by grinding the shoulder regions of the tire tread.

While the invention has been described in combination with embodiments thereof, it is evident that many alternatives, modifications, and variations will be apparent to those skilled in the art in light of the foregoing teachings. Accordingly, the invention is intended to embrace all such alternatives, modifications and variations as fall within the scope of the appended claims.

We claim:

1. A method for correcting the conicity value of a tire having a circumferential tire tread with top and bottom shoulder regions and a central region therebetween, said method comprising the steps of:

a) calculating a conicity value (CV) of said tire;

b) comparing the absolute value (NCV) of said CV to a target conicity value (TCV) and continuing with step c) if said NCV is greater than said TCV and equal to or less than a maximum conicity value (MCV), c) pre-positioning (PREP) a grinder assembly with respect to said tire;

d) grinding rubber from said selected one of said top and bottom shoulder regions, measuring lateral force while grinding, and using lateral force measurements as feedback for controlling the grinding time; and e) returning to step a).

2. The method of claim 1 wherein the step b) further includes the steps of:

calculating a lateral shift correction (LSCOR) equal to the difference between said NCV and said TCV;

calculating a target lateral shift (TLSCCW); and calculating a first control product (CP1) equal to the product of said TLSCCW and a sign factor (SNF).

3. The method of claim 2 wherein the step d) further includes the steps of:

1) calculating the present value of the average lateral force in the rotational direction being used for grinding (PLSCCW);

2) calculating a second control product (CP2) equal to the product of said PLSCCW and said SNF; and 3) comparing said CP2 to said CP1 and wherein:
      if said CP2 is greater than said CP1, repeating steps 1)–3); and if said CP2 equals said CP1 or said CP2 is less than said CP1, terminating grinding and proceeding from step d) to step e).

4. The method of claim 2 wherein said step of calculating the TLSCCW includes the step of:

calculating the difference between an average lateral force in the direction of grinding (LSCCW) and the product of said LSCOR and said sign factor SNF, wherein said SNF equals +1 when said CV is positive, and equals −1 when said CV is negative.

5. The method of claim 2 wherein said step of calculating said LSCOR further includes adding a confidence offset value (COS) to said LSCOR value.

6. The method of claim 1 wherein said conicity value (CV) as determined in step a) is equal to one half of the sum of the average lateral force in the clockwise direction (LSCW) and the average lateral force in the counter-clockwise direction (LSCCW).

7. The method of claim 6 wherein the step a) includes the steps of:

indexing said tire tread into a series of circumferential increments, each of said increments including said top and bottom shoulder regions;

measuring said LSCW corresponding to said series of circumferential increments of said tire tread and assigning said LSCW a positive value; and measuring said LSCCW corresponding to said series of circumferential increments of said tire tread and assigning said LSCCW a negative value.

8. The method of claim wherein the step c) includes the step of:

selecting which of said top and bottom shoulder regions is to be ground based on information about whether said tire being tested is:
   a Type 1 tire in which grinding said top shoulder region for conicity causes a positive shift in said CV and grinding said bottom shoulder region causes a negative shift in said CV or,
   a Type 2 tire in which grinding said top shoulder region for conicity causes a negative shift in said CV and grinding said bottom shoulder region causes a positive shift in said CV.

9. The method of claim 8 wherein the step c) further includes the steps of:

inputting whether said tire being tested is a Type 1 or Type 2 tire;

inputting said CV as calculated in Step a);

selecting which of said top and bottom shoulder regions is to be ground; and

PREP said grinder assembly with respect to said shoulder region selected to be ground.

10. The method of claim 9 wherein the step of selecting which of said top and bottom shoulder regions is to be ground comprises selecting said top shoulder region when:

said tire is a Type 1 tire and said CV is a positive value; or said tire is a Type 2 tire and said CV is a negative value.

11. The method of claim 9 wherein the step of selecting which of said top and bottom shoulder regions is to be ground comprises selecting said bottom shoulder region when:

said tire is a Type 1 tire and said CV is a negative value; or said tire is a Type 2 tire and said CV is a positive value.

12. The method of claim 1 further including the steps of:

rotating said tire in a first direction; and rotating a grinding wheel of said top and bottom shoulder grinders in said first direction.

13. The method of claim 1 wherein said step a) of calculating a CV further includes subtracting a machine conicity offset (MCOS) value from said CV.

14. The method of claim 1 further including the steps of:

correcting excessive lateral force variations developed by said tire;

correcting excessive radial run-out of said tire; and correcting excessive radial force variations developed by said tire.

15. The method of claim further including the step of:

correcting said excessive lateral force variations, said excessive radial run-out, and/or said excessive radial force variations developed by said tire simultaneously with correcting for conicity.

16. The method of claim further including the step of:

providing a tire force variation machine including a freely rotating loading wheel, an assembly which rotates said tire against said loading wheel to measure radial and lateral forces on said loading wheel as said tire rotates against said loading wheel, top and bottom shoulder grinders of said grinder assembly which move independently into and out of cutting engagement with said top and bottom shoulder regions of said tire tread, and a computer into which measurements and preset values are inputted for calculating and comparing operations and for controlling said top and bottom shoulder grinders.

* * * * *